(12) United States Patent
Vreede

(10) Patent No.: US 12,503,065 B2
(45) Date of Patent: Dec. 23, 2025

(54) GUIDING CABLE WITH RIBBED INSULATION COVER

(71) Applicant: DAF Trucks N.V., Eindhoven (NL)

(72) Inventor: Robert Jacobus Vreede, Geldrop (NL)

(73) Assignee: DAF Trucks N. V., Eindhoven (NL)

( * ) Notice: Subject to any disclaimer, the term of this patent is extended or adjusted under 35 U.S.C. 154(b) by 371 days.

(21) Appl. No.: 18/037,133

(22) PCT Filed: Nov. 17, 2021

(86) PCT No.: PCT/NL2021/050709
§ 371 (c)(1),
(2) Date: May 16, 2023

(87) PCT Pub. No.: WO2022/108447
PCT Pub. Date: May 27, 2022

(65) Prior Publication Data
US 2023/0415673 A1 Dec. 28, 2023

(30) Foreign Application Priority Data
Nov. 17, 2020 (NL) ..................................... 2026912

(51) Int. Cl.
*B60R 16/02* (2006.01)
*B60K 1/00* (2006.01)
*H02G 3/04* (2006.01)

(52) U.S. Cl.
CPC ............ *B60R 16/0215* (2013.01); *B60K 1/00* (2013.01); *H02G 3/0456* (2013.01)

(58) Field of Classification Search
CPC ........ H02G 3/04; H02G 3/0487; H02G 11/00; H02G 3/34; H02G 3/26; H02G 1/06;
(Continued)

(56) References Cited

U.S. PATENT DOCUMENTS 9,576,701 B2 * 2/2017 Suzuki ..................... H01B 9/00
2007/0234559 A1 * 10/2007 Tokuda ................ B60K 7/0007
140/92.1
(Continued)

FOREIGN PATENT DOCUMENTS

EP 2317619 A1 5/2011
ES 2326803 T3 * 10/2009 ............. B60R 19/03
(Continued)

OTHER PUBLICATIONS

JP-4081889-B2 English Translation (Year: 2008).*
(Continued)

*Primary Examiner* — Michael T. Walsh
(74) *Attorney, Agent, or Firm* — Banner & Witcoff, Ltd.

(57) ABSTRACT

A truck with cable support is disclosed, including a chassis, accommodating an electric power source for powering an electric motor; an E-axle, comprising the electric motor and arranged as a rear wheel driving axle of the truck; a suspension system, suspending the E-axle to the chassis and allowing movement of the E-axle in a vertical direction relative to the chassis; a power cable, electrically connecting the electric power source to the E-axle; and a support beam, forming a mechanical support structure to lead the power cable along a cable path extending between a chassis mount and an E-axle mount. The support beam includes one or more bending stiffness elements, forming a stiffness of the support beam that is highest in a middle section and that decreases towards the chassis mount and the E-axle mount, evenly distributing the bending stress in the support beam along the cable path when the E-axle moves relative to the chassis, to prevent local fatigue failure of the power cable.

13 Claims, 8 Drawing Sheets

(58) Field of Classification Search
CPC ........ H02G 3/081; H02G 3/00; H02G 15/007; H02G 3/38; H02G 15/1813; H02G 15/10; H02G 5/025; H02G 3/40; H02G 3/0641; H02G 3/0633; H02G 3/0456; B60R 16/0215; B60K 1/00

See application file for complete search history.

(56) References Cited

U.S. PATENT DOCUMENTS

| | | | |
|---|---|---|---|
| 2011/0132638 A1* | 6/2011 | Oga | B60R 16/0215 174/135 |
| 2015/0114680 A1 | 4/2015 | Nao et al. | |
| 2019/0045678 A1 | 2/2019 | Ito et al. | |

FOREIGN PATENT DOCUMENTS

| | | | | |
|---|---|---|---|---|
| JP | 2006156051 A * | 6/2006 | ......... | B60R 16/0215 |
| JP | 3809546 B2 * | 8/2006 | | |
| JP | 2008001241 A * | 1/2008 | ............. | B60L 50/51 |
| JP | 4081889 B2 * | 4/2008 | ............. | B60K 6/442 |
| JP | 6448018 B2 * | 1/2019 | | |
| WO | WO-2012032301 A1 * | 3/2012 | ............. | B21B 1/088 |
| WO | WO-2013183404 A1 * | 12/2013 | ............... | H01R 4/70 |
| WO | 2014045708 A1 | 3/2014 | | |
| WO | 2017114418 A1 | 7/2017 | | |

OTHER PUBLICATIONS

JP-6448018-B2 English Translation (Year: 2019).*
JP-2006156051-A English Translation (Year: 2006).*
JP-2008001241-A English Translation (Year: 2008).*
JP-3809546-B2 English Translation (Year: 2006).*
WO-2013183404-A1 English Translation (Year: 2013).*
WO-2012032301-A1 English Translation (Year: 2012).*
ES-2326803-T3 English Translation (Year: 2009).*
International Search Report and Written Opinion—PCT/NL2021/050709—mailing date May 27, 2022.

* cited by examiner

GUIDING CABLE WITH RIBBED INSULATION COVER

CROSS-REFERENCE TO RELATED APPLICATIONS

This application is a U.S. National Stage application under 35 U.S.C. § 371 of International Application PCT/NL2021/050709 (published as WO 2022/108447 A1), filed Nov. 17, 2021, which claims the benefit of priority to Application NL 2026912, filed Nov. 17, 2020. Benefit of the filing date of these prior applications is hereby claimed. Each of these prior applications is hereby incorporated by reference in its entirety.

FIELD OF INVENTION

The invention relates to a truck with a cable support.

DESCRIPTION OF THE PRIOR ART

In conventional trucks, the driven axle may get its torque from a power train comprising an internal combustion engine, a gear box and a drive shaft. In hybrid or fully electric trucks however, the driven axle is instead powered by an electric motor. As a result of its compactness, an electric powertrain can have all of the functions of a conventional powertrain embedded in a single body, also known as an E-axle. Typically, the E-axle receives its energy from an electric power source, e.g. a battery pack or fuel cells, located elsewhere in the truck and connected through one or multiple power cables.

For configurations in which the E-axle is directly attached to the wheels of the truck, the E-axle moves with respect to the electric power source while the truck is driving. To allow for this relative movement, the power cable should also bend or deflect with the movement of the E-axle. This deflection can cause a durability problem due to an inherent fatigue limit of the power cable.

Considering various road surface conditions, e.g. bumps and holes, and load conditions of the driven axle, e.g. cornering, accelerating, braking and trailer load distribution, this poses a significant challenge for trucks with E-axles, with respect to power cabling fatigue issues.

There is a need for further improvement with regards to cable supports in trucks, that alleviate these or other problems.

SUMMARY OF THE INVENTION

In one aspect, it is aimed to provide a truck with a cable support. The truck comprises a chassis, an E-axle, a suspension system, a power cable and a support beam. The chassis accommodates an electric power source for powering an electric motor. The E-axle comprises said electric motor and is arranged as a rear wheel driving axle of the truck. The suspension system suspends the E-axle to the chassis and allows movement of the E-axle in a vertical direction relative to the chassis. The power cable electrically connects the electric power source to the E-axle, and the support beam forms a mechanical support structure to lead the power cable along a cable path extending between a chassis mount and an E-axle mount. The support beam comprises one or more bending stiffness elements, forming a stiffness of the support beam that is highest in a middle section and that decreases towards the chassis mount and the E-axle mount, evenly distributing the bending stress in the support beam along the cable path when the E-axle moves relative to the chassis, to prevent local fatigue failure of the power cable.

In an embodiment, an electrically conductive core is mounted between the chassis mount and the E-axle mount, to make a ground connection between the E-axle and the chassis and the support beam may be mounted to the conductive core along at least a part of the cable path, e.g. to form an electrically insulating sleeve with a bending stiffness that varies along the cable path.

In other or further embodiments, the support beam comprises bending stiffness elements comprising one or more flanges extending along the cable path. The flanges may have a flange height that is highest in the middle section of the support beam and that decreases towards the chassis mount and the E-axle mount. In one embodiment, the bending stiffness elements may comprise two vertically extending flanges forming an H-beam to prevent the support beam from deflecting in a lateral direction.

In some embodiments, the support beam extends from the chassis mount in a backward direction along a longitudinal member of the chassis and approaches the E-axle mount along the vertical direction, to obtain a compact yet serviceable cable support solution. Preferably, the E-axle comprises a rear section outer surface provided with connectors, to provide input ports to the electric motor, wherein said connectors are provided in an orientation to guide one or more high voltage power cables adjacent the rear section outer surface in a vertical upward direction.

In yet further embodiments, the support beam comprises laterally extending cable supports arranged for leading multiple power cables adjacent the cable path, each power cable following the cable path at a lateral offset from the support beam. The multiple power cables may be connected to the E-axle by a common power connector, at a distance beyond the E-axle mount to allow disconnecting the power cables without disassembling the support beam from the E-axle mount.

BRIEF DESCRIPTION OF THE DRAWINGS

The invention will be further elucidated in the figures.

DETAILED DESCRIPTION

Figure 1:
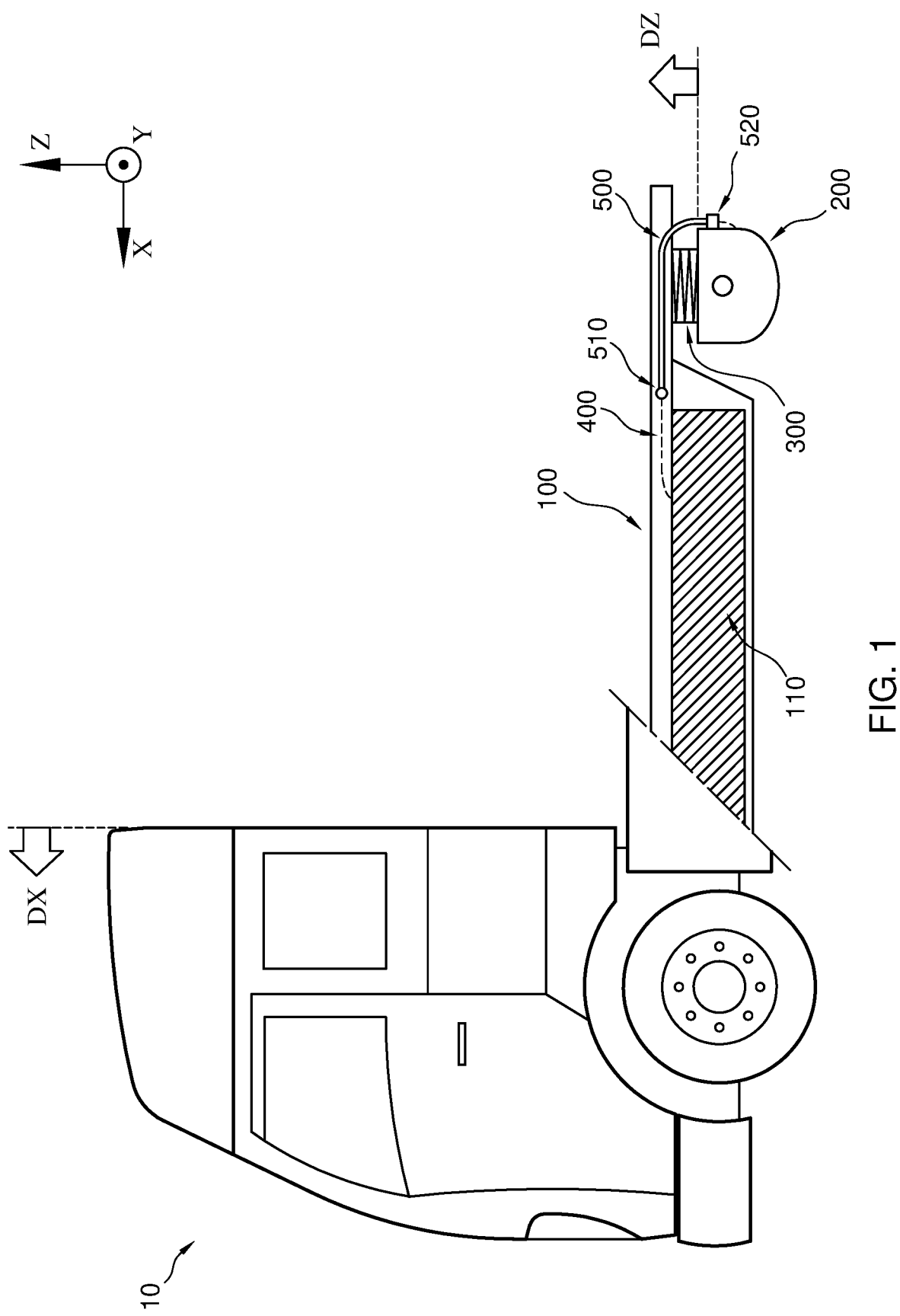
FIG. 1 shows a truck with a cable support according to a first embodiment.

The invention is described more fully hereinafter with reference to the accompanying drawings, in which embodiments of the invention are shown. In the drawings, the absolute and relative sizes of systems, components, layers, and regions may be exaggerated for clarity.

Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 shows a truck 10 with a cable support 50 according to a first embodiment. The truck 10 comprises a chassis 100, accommodating an electric power source 110 for powering an electric motor, and an E-axle 200, comprising said electric motor and arranged as a rear wheel driving axle of the truck. The truck 10 further comprises a suspension system 300, suspending the E-axle 200 to the chassis 100 and allowing movement of the E-axle 200 in a vertical direction DZ relative to the chassis 100. The truck 10 further comprises a power cable 400, electrically connecting the electric power source 110 to the E-axle 200. The truck further comprises a support beam 500, forming a mechanical support structure to lead the power cable 400 along a cable path extending between a chassis mount 510 and an E-axle mount 520.

Figure 2:
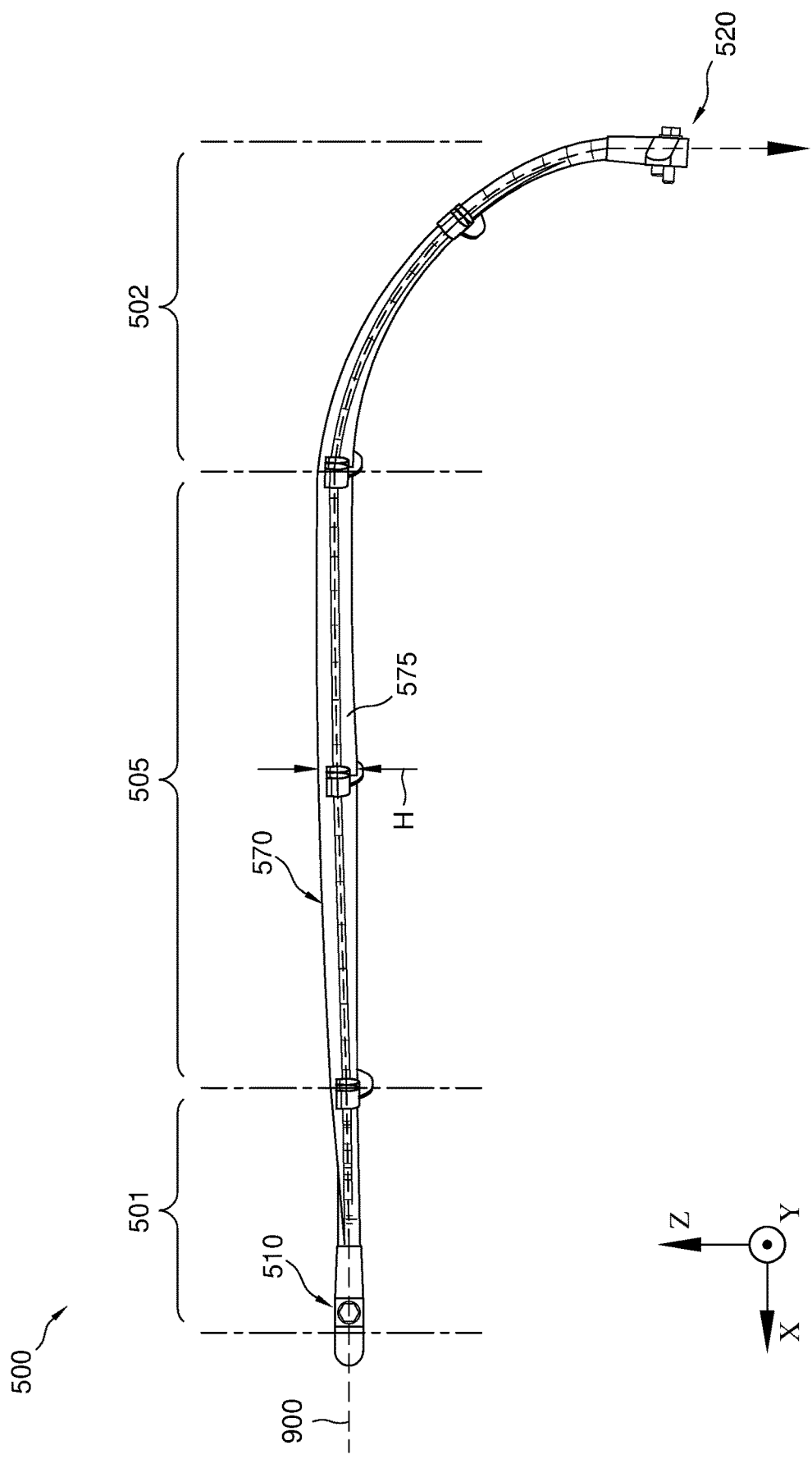
FIG. 2 provides an embodiment of a support beam.

In more detail with reference to FIG. 2, the support beam 500 comprises one or more bending stiffness elements 570, forming a stiffness of the support beam 500 that is highest in a middle section 505 and that decreases towards chassis mount 510 and E-axle mount 520, evenly distributing the bending stress in the support beam 500 along the cable path when the E-axle 200 moves relative to the chassis 100, to prevent local fatigue failure of the power cable 400.

Turning back to FIG. 1, a conventionally driven axle of a truck gets its torque from an internal combustion engine through a gear box and a drive shaft. An E-axle however, may have these functions inside the axle body, owing to the compactness of the electric motor. The E-axle gets its energy through one or multiple high voltage (HV) power cables 400 running from the chassis 100, accommodating the electrical power source 110, to the E-axle 200.

The E-axle moves as a result of driving conditions of the truck 10, with movement characteristics depending on road surface conditions and load conditions of the driven axle, e.g. cornering, accelerating, braking and trailer load distribution. In the embodiment shown in FIG. 1, the E-axle 200 moves relative to the chassis 100 in the vertical direction DZ. For example, the vertical movement of the E-axle 200 is between fifteen centimeters in an upward direction +DZ and twenty five centimeters in a downward direction −DZ, more preferably between ten centimeters upward +DZ and fifteen centimeters downward −DZ.

To form an electrical connection between the electric power source 110 and the moving E-axle 200, the ends of the power cable 400 may comprise connectors for coupling to these parts. Alternatively, the power cable can be an integral part of the electric power source 110 or E-axle 200, or the ends of the power cable 400 can be fixated to these elements in a different way, e.g. by soldering. Besides at its ends, the power cable 400 can also be intermediately fixated along its length, e.g. on the chassis longitudinal members.

A benefit of the present invention is that it avoids local fatigue in the power cable 400, by having a support beam 500 that spreads the total movement of the power cable 400 equally along the cable path, by evenly distributing the bending stress in the support beam 500.

For example, considering a power cable 400 having ten parts of equal length, the support beam 500 as disclosed herein guides the power cable 400 to have each part take up approximately ten percent of the total cable movement.

Figure 3:
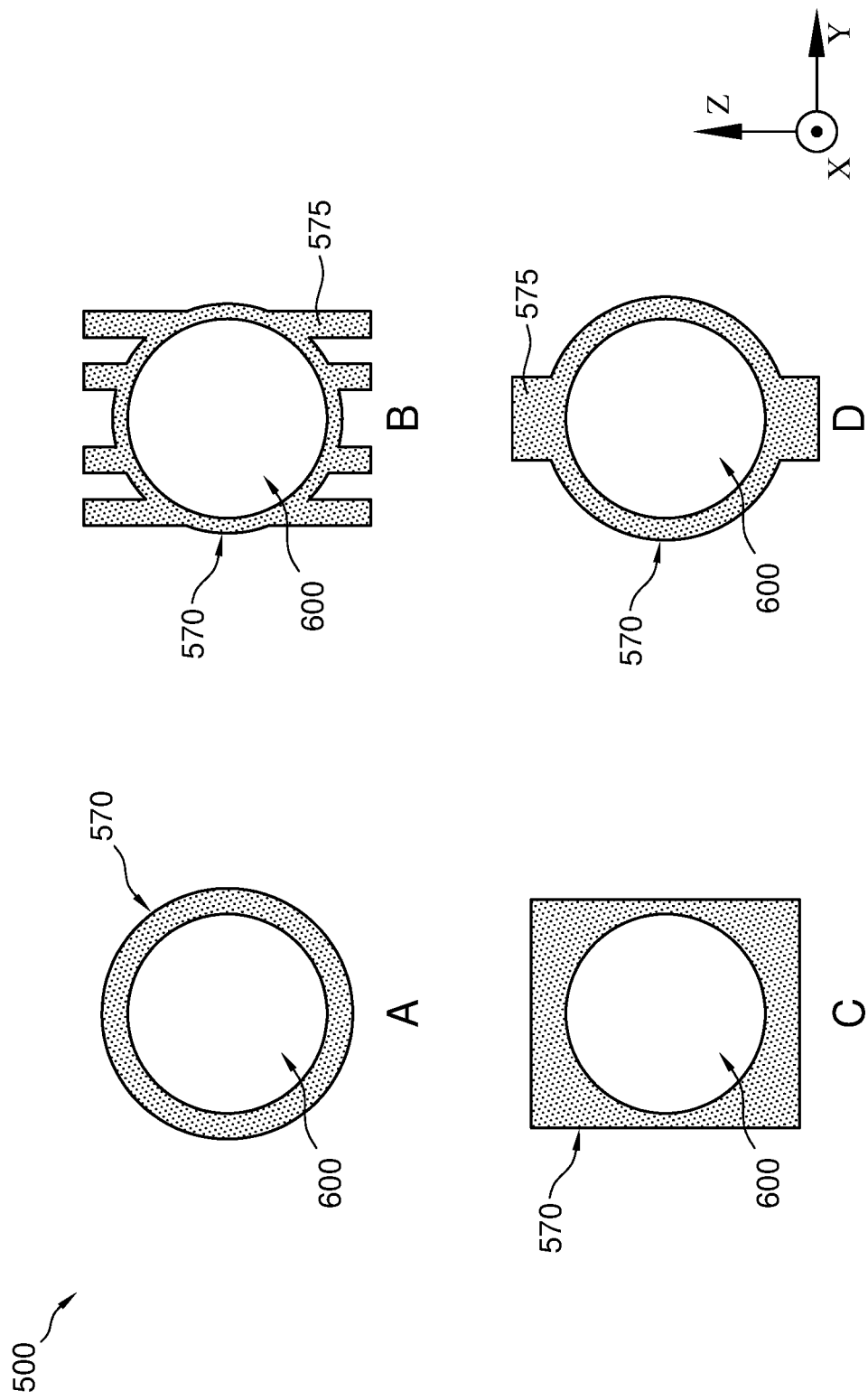
FIG. 3 (A, B, C, D) provides cross section views of further embodiments of the support beam.

Turning to FIG. 3, in a preferred embodiment, the support beam 500 comprises one or more bending stiffness elements 570, e.g. comprising ribs, plates, webs, struts, splints, bars, beams, or girders. As another example, FIG. 3D shows bending stiffness elements 570 comprising flanges 575. These can an integrally formed part of the support beam 500 or can be separately mounted elements. The bending stiffness elements 570 are arranged to form a stiffness of the support beam 500 that is highest in a middle section and that decrease towards the chassis mount 510 and the E-axle mount 520.

Preferably, the support beam 500 has an area moment of inertia that varies along the cable path, for example by having an axial cross section that is larger in the middle section and that decreases towards the chassis mount 510 and the E-axle mount 520, or by locating a larger fraction of the axial cross section of the support beam 500 at a distance from its neutral axis, i.e. bending axis. This beam profile can e.g. be manufactured from a single base material such as a metal or polymer, e.g. by injection molding, thermoforming, plate folding, extrusion, milling, or additive manufacturing.

Alternatively or additionally, the support beam 500 may be composed of parts having different material properties, e.g. with different Young's modulus and shear modulus. Accordingly, relatively stiff parts can be used to reinforce the middle section of the support beam 500, while relatively flexible parts are used towards the chassis mount 510 and the E-axle mount 520.

In a preferred embodiment, an electrically conductive core 600 is mounted between the chassis mount 510 and the E-axle mount 520, to make a ground connection between the E-axle 200 and the chassis 100. Preferably, the support beam 500 is mounted to the conductive core along at least a part of the cable path, e.g. to form an electrically insulating sleeve with a bending stiffness that varies along the cable path 900. The reinforced sleeve formed by the support beam 500, in turn, may guide the power cable 400 while preventing local fatigue failure of the power cable 400.

For example, the conductive core can be a wire cable comprising a relatively low-grade metal conductor such as steel or Aluminum, with an electrical resistance suitable for forming a ground connection or potential equalization connection. Alternatively, the conductive core can comprise a relatively high-grade conductor, e.g. identical or similar to the power cable 400.

In some embodiments, the conductive core has a relatively low degree of stiffness with respect to the support beam 500, e.g. a relative stiffness lower than fifty percent, preferably between ten and fifty percent. Having a conductive core with a relatively low degree of stiffness also reduces the minimum stiffness of the support beam 500 along the length of the cable path, thereby improving its capability to prevent local fatigue of the power cable 400.

Preferably, conductive core 600 comprises a steel cable twined around a greased fiber core. The grease can ensure flexibility of the steel cable over its lifetime. The support beam 500 covering of the conductive core prevents the loss or degradation of the grease in the steel cable.

In other or further embodiments, the conductive core 600 can be used as an axial strain relief between the chassis mount 510 and the E-axle mount 520, to protect the one or more power cables 400 and its connectors against excessive axial loads. An axial strain relief can e.g. be formed when the distance between axial mounts of the power cables 400 is longer than the distance between the chassis mount 510 and E-axle mount 520. For example, both ends of the conductive core can be fitted with a lug with an eye to bolt the cable to the frame and the rear axle, while the power cable 400 is only radially supported along the support beam 500.

The conductive core 600 and the support beam 500 can be positioned in a predefined shape. For example, in a die casting or injection molding manufacturing process, the conductive core 600 can be laid out along a desired cable path 900 and the support beam 500 can be cast or molded around the core to form a well-defined cable support.

FIG. 2 provides an embodiment of a support beam 500, comprising bending stiffness elements comprising one or more flanges 575 extending along the cable path 900, the flanges 575 having a flange height (H) extending in the vertical direction +Z/−Z. The flange height (H) is highest in the middle section 505 and decreases towards the chassis mount 510 and the E-axle mount 520.

In the embodiment of FIG. 2, three typical areas can be distinguished along the cable path 900: (i) Starting at the chassis mount 510, the support beam comprises a chassis end section 501, which extends horizontally in the −X direction from the chassis mount 510. As the distance to the chassis mount 510 increases, the bending stiffness of the support beam 500 increases as well. (ii) Next, the support beam 500 transitions into middle section 505, in which the bending stiffness of the support beam 500 reaches a maximum. (iii) Going towards the E-axle mount 520, the support beam 500 comprises an E-axle end section 502, which approaches the E-axle mount 520 vertically in the −Z direction along the cable path 900. Similar to the chassis end section 501, the bending stiffness of the E-axle end section 502 is lower towards the E-axle mount 520 and increases as the distance thereto is increased.

Additionally, in the configuration as shown in FIG. 2, the vertical orientation of the E-axle end section 502 increases the (vertical) bending stiffness of that section of the support beam 500. This may allow the absolute length of the E-axle end section 502 to be longer than the chassis end section 501, however only the projected lengths of the sections 501, 505, 502 along the X direction may be relevant for determining the bending stiffness in the vertical direction Z of the support beam 500. The stiffness of the support beam 500 can be relatively less sensitive to the distance between the chassis mount 510 and E-axle mount 520 in the vertical direction Z, than to the distance between the chassis mount 510 and E-axle mount 520 in the horizontal direction X. By having a support beam 500 that approaches the E-axle mount 520 vertically in the −Z direction along a longer cable path 900, a longer length of power cable 400 can be supported by a less sensitive support beam 500, which improves spreading the total movement of the power cable 400 equally along the cable path 900.

In a preferred embodiment, the bending stiffness elements comprise one or more flanges 575 with a flange height (H) that varies along the cable path 900 to reinforce the support beam 500 to evenly distribute the bending stress in the support beam 500 along the cable path 900. For example, toward the chassis mount 510 and the E-axle mount 520 the flange height (H) can be close to zero, or between zero and one centimeter. Conversely, moving away from the chassis mount 510 and the E-axle mount 520 toward the middle section 505, the flange height (H) for example increases to a height between one and six centimeters, preferably between one and four centimeters, more preferably between two and three centimeters.

An intermediate flange height can be appropriate for transition areas between sections 501, 502, 505, e.g. between zero and three centimeters.

In some embodiments, the flange height (H) may vary within a section 501, 502, 505 along the cable path 900. Variations in flange height (H) can be gradual or step-wise.

Alternatively, variations in stiffness along the cable path may comprise the presence of less or more flanges 575, and/or flanges 575 of varying thickness, and/or flanges 575 extending from the support beam 500 in different directions. Alternatively, the directions of the flanges 575 may vary along the cable path, e.g. initially extending in a horizontal direction Y for generating a low bending stiffness and transitioning into a vertical direction Z along the middle section 505 for generating an increased bending stiffness.

FIG. 3 provides cross section views of further embodiments of the support beam including bending stiffness elements 570. As shown in FIG. 3A, the support beam 500 comprises bending stiffness elements 570 in the form of a sleeve with a circular axial cross section, e.g. around an electrically conductive core 600. For example, the bending stiffness elements 570 can have a relatively thinner wall thickness toward the chassis mount 510 and the E-axle mount 520, and a relatively thicker wall thickness in the middle section 505, to form a stiffness of the support beam 500 that is highest in the middle section 505.

Alternatively or additionally, the support beam 500 may comprise bending stiffness elements 570 in the form of a sleeve comprising multiple flanges 575 as shown in FIG. 3B. The flanges 575 may extend vertically upwards +Z and/or downwards −Z from the sleeve, or in other directions to form an area moment of inertia which is larger in a certain direction. For example, by orienting the flanges 575 in a vertical direction Z at a distance from the neutral (bending) line, the support beam 500 can be more flexible in the vertical direction Z compared to a lateral direction Y.

In other or further embodiments, as can be seen in FIG. 3C, the cross section of the support beam 500 can have a solid geometrical shape such as rectangular, e.g. having a height larger than a width, thereby creating a bending stiffness which is larger in the vertical direction Z than in the lateral direction Y. Alternative solid cross section shapes, such as square or triangular can be used to achieve different bending stiffness characteristics, as known by the person skilled in the art.

FIG. 3D shows another embodiment of a support beam 500 comprising bending stiffness element 570 in the form of a sleeve, e.g. around a circular wire core, comprising a single flange 575 extending in the vertical direction +Z/−Z on both sides of the sleeve. The bending stiffness of the support beam 500 of FIG. 3D can e.g. be tuned by increasing or decreasing the height or thickness of the flange 575, or by changing the direction of the flange 575.

Figure 4:
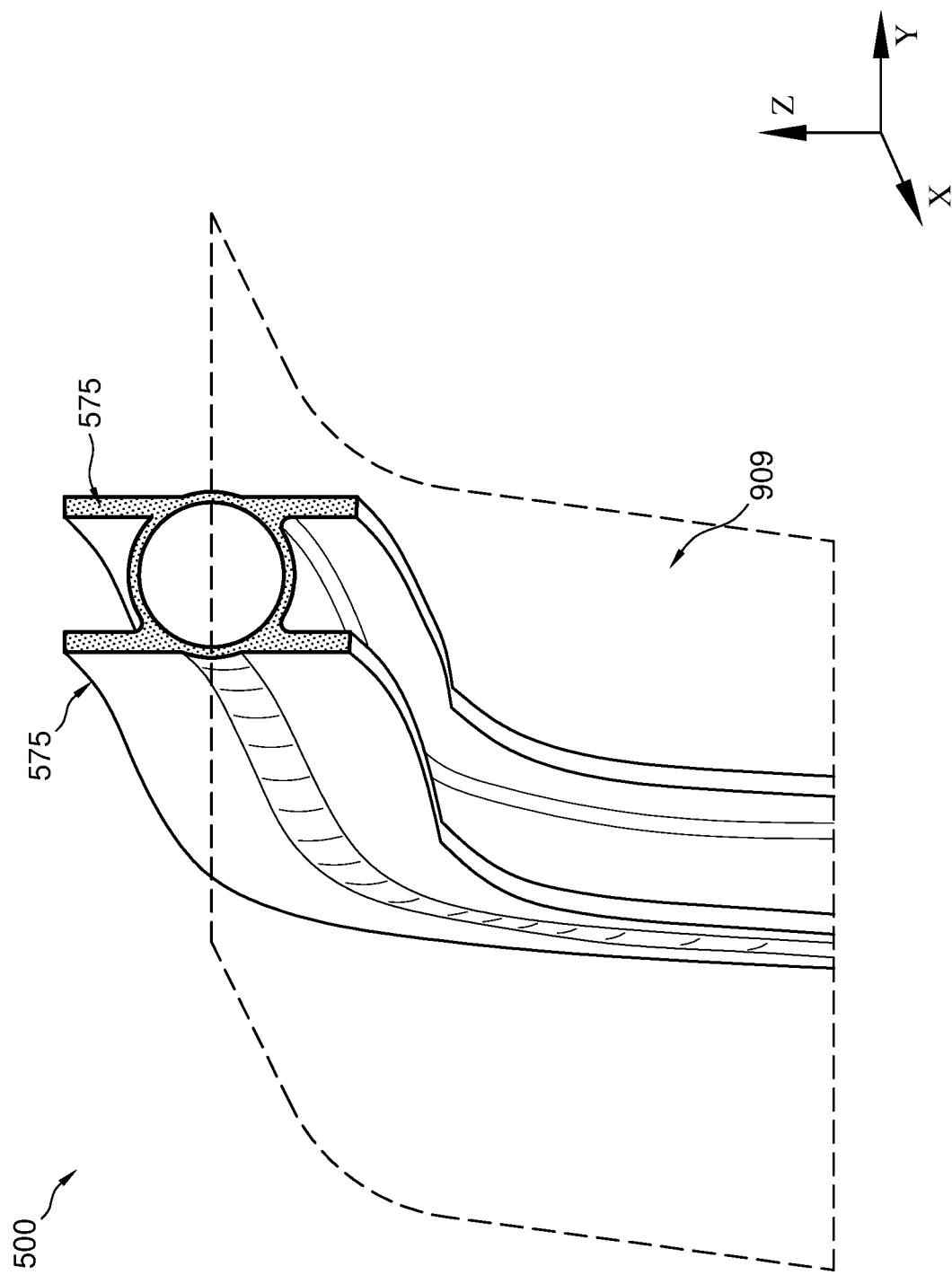
FIG. 4 shows another embodiment of the support beam.

FIG. 4 shows another embodiment of a support beam 500. Preferably, the bending stiffness elements 570 comprise two vertically extending flanges 575 forming an H-beam to prevent the support beam 500 from deflecting in a lateral direction Y. By having a support beam 500 designed to bend only in the vertical direction Z, the cable path 900 defines a neutral bending plane 909 lateral to the support beam 500, which can be used for guiding one or more power cables 400 parallel adjacent the support beam 500, with all power cables 400 following a bending profile similar to that of the support beam 500 along the length of the cable path 900.

Figure 5:
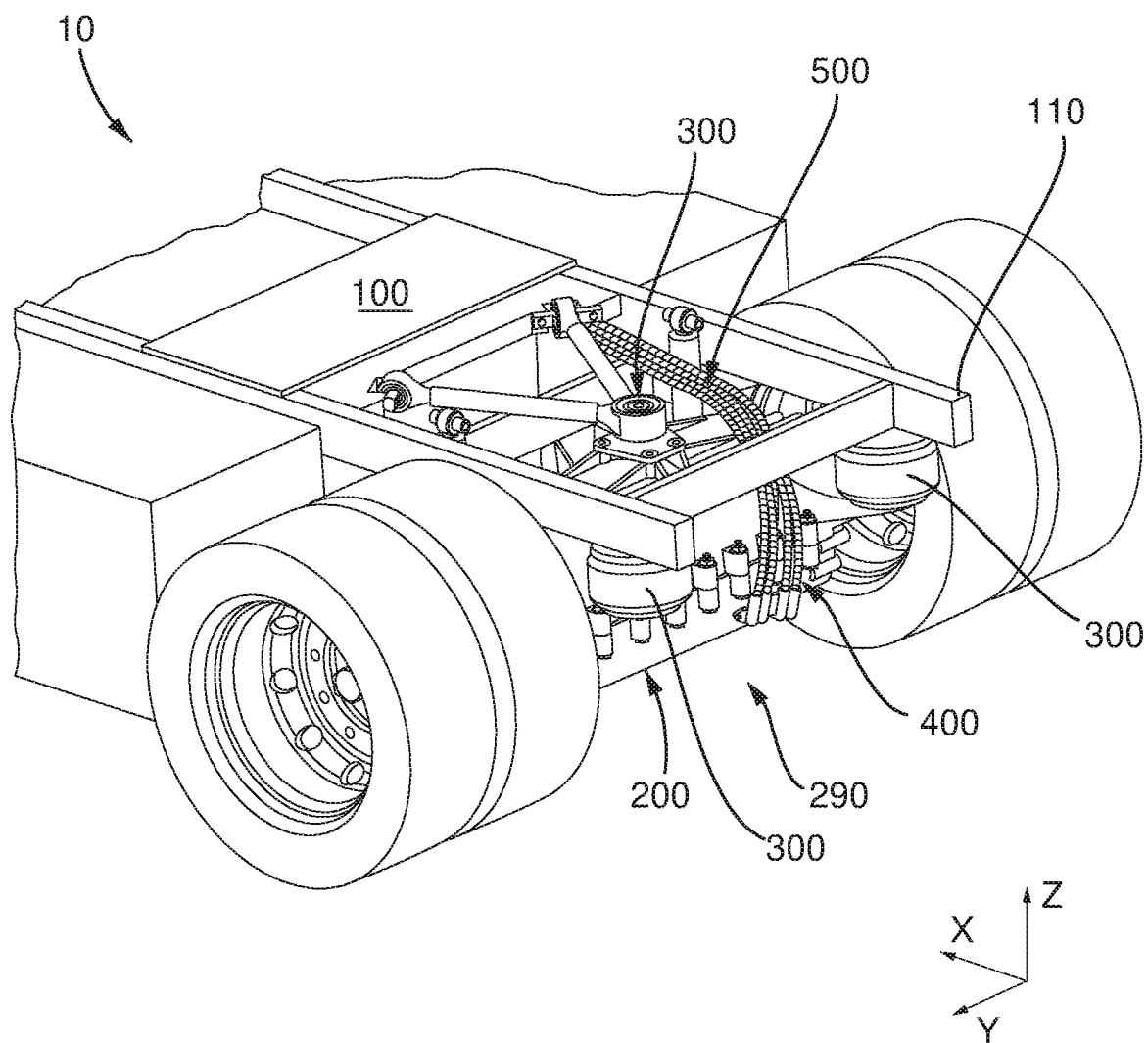
FIG. 5 depicts a further embodiment of a truck with a cable support.

FIG. 5 depicts a further embodiment of a truck 10 with a support beam 500. Preferably, the support beam 500 extends from the chassis mount 510 in a backward direction −X along a longitudinal member 110 of the chassis 100, and approaches the E-axle mount 520 along the vertical direction −Z. The benefit of this configuration, is that the length of the power cables 400 can be made as long as possible within the given length of the truck 10, which reduces the movement amplitude per centimeter of cable when the E-axle 200 moves relative to the chassis 100. By having the support beam 500 extend along a longitudinal member 110 of the chassis 100, e.g. on an inside surface of the longitudinal member 110, the power cables can be shielded inside the chassis 100 against dirt, damage, and electromagnetic emission.

Preferably, the E-axle 200 comprises a rear section outer surface 290 provided with connectors, to provide input ports to the electric motor. Preferably, the rear section outer surface 290 is easily accessible from the bottom of the truck, e.g. for service or maintenance. Preferably, the rear section outer surface 290 is a surface on a rear half, more preferably a rear bottom quadrant of the E-axle.

Most preferably, the connectors are provided in an orientation to guide one or more high voltage power cables 400 adjacent the rear section outer surface 290 in a vertical upward direction +Z. For example, the connectors can be provided on a rear section outer surface 290 which is substantially flat and smooth, so that power cables 400 can closely be guided upward along the E-axle 200. The connectors on the rear section outer surface 290 can e.g. be straight connectors oriented outward, while the connectors on the power cables 400 are right-angle connectors, or vice versa. Alternatively, the rear section outer surface 290 may for example be oriented relatively upward or perpendicular to the outer surface of the E-axle, so that straight connectors can be used on the rear section outer surface 290 and on the power cables 400.

Figure 6:
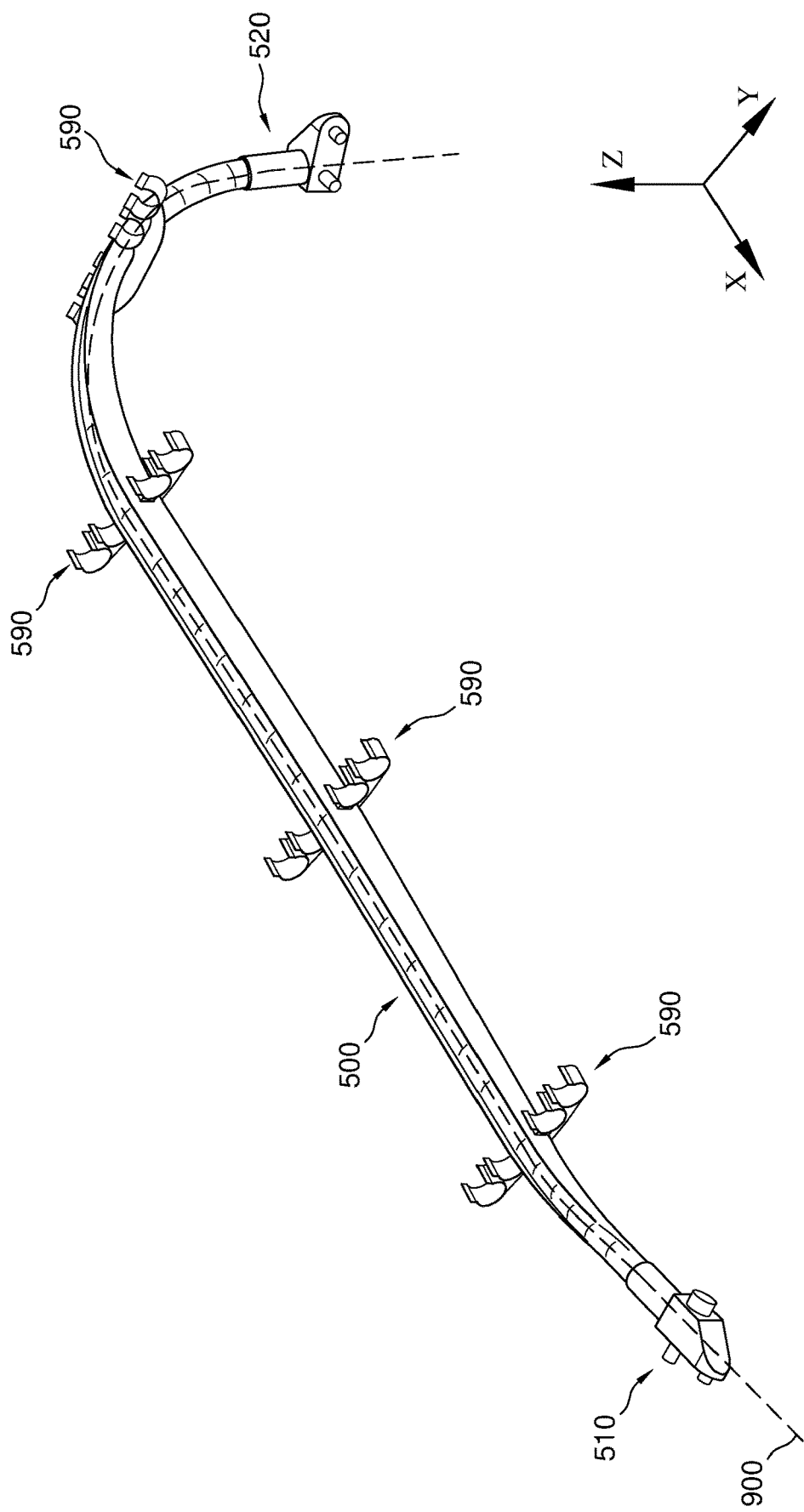
FIG. 6 shows a further embodiment of a support beam comprising laterally extending cable supports.
Figure 7:
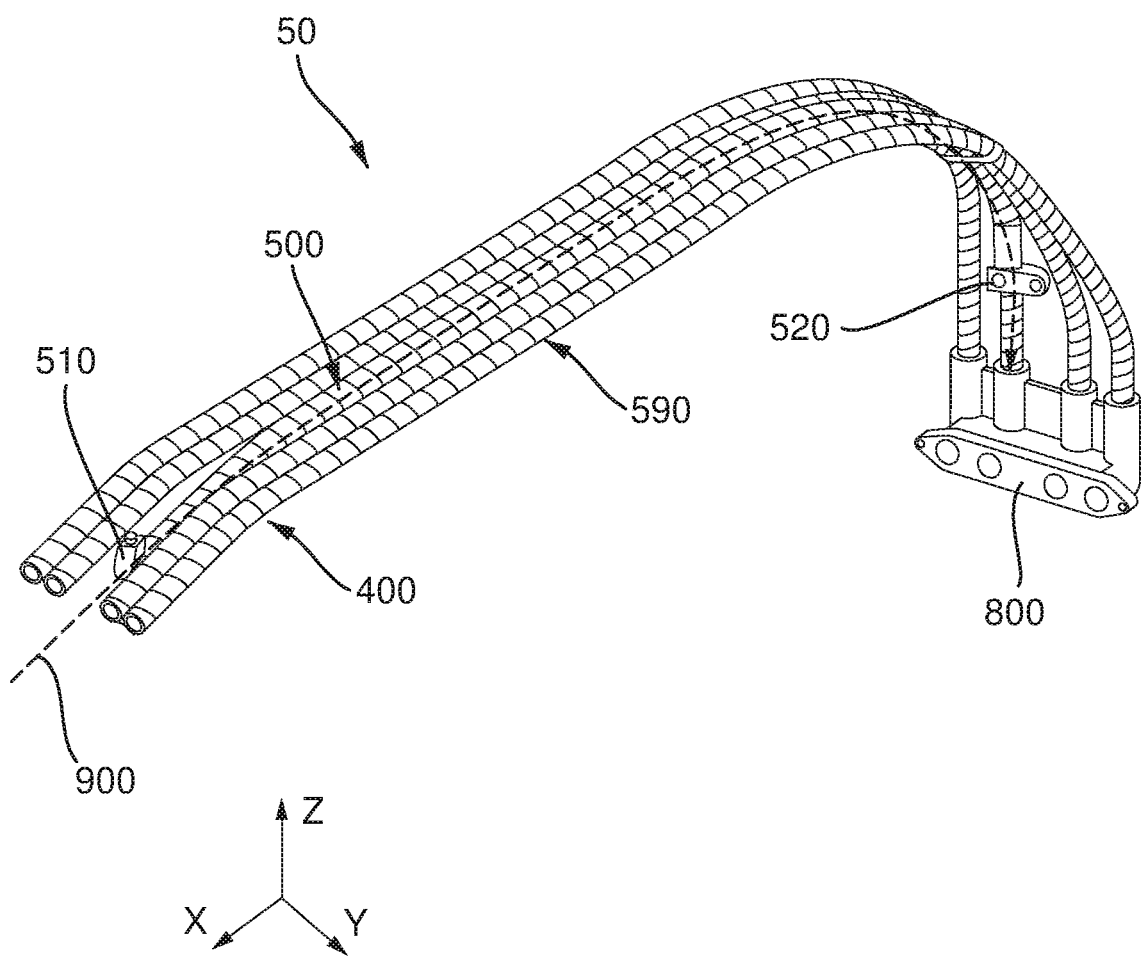
FIG. 7 provides a further embodiment of a cable support comprising a common power connector.

FIG. 6 shows a further embodiment of a support beam 500, comprising laterally extending carriers 590. Preferably, the laterally extending carriers 590 are arranged for leading multiple power cables 400 adjacent the cable path 900 as shown in FIG. 7, each power cable 400 following the cable path 900 at a lateral offset from the support beam 500. For example, the carriers 590 may provide holes, clips, clamps, or slots on a support structure extending perpendicularly from the carriers 500 in the lateral direction Y to guide the one or more power cables 400 adjacent cable path 900, e.g. by fixating the power cable 400 at the laterally extending carriers 590 spaced along the length of the cable path 900. The number of carriers 590 is preferably minimized, since fixations on the carriers 590 may induce forces, thus bending stresses, on the power cables 400. Preferably, the carriers 590 extend laterally from both sides of the support beam 500, so that the weight of the power cables 400 supported on one side of the support beam 500 can be balanced relative to that supported on the other side.

Alternatively, the support beam 500 comprises support plates laterally extending from the support beam 500 along the cable path 900. The support plates may provide a support in the vertical direction +Z (against gravity) for the one or more power cables 400, arranged on the support plates adjacent the support beam 500 along the cable path 900. The support plates may have a folded up distal edge to prevent the power cables 400 from falling off the sides.

Preferably, the support beam 500 is made of a polymer material to provide a layer of electrical insulation between the core of the power cables 400 and the electrically conductive core 600 inside the support beam 500, e.g. for safety reasons. By using a polymer material, the support beam 500 and carriers 590 can be manufactured as an integral part, e.g. by injection molding or die casting. More beneficially, for a given electrically conductive core 600, e.g. a steel wire core, the support beam 500 and carriers 590 can for example be molded around the core 600 while the core 600 is laid out along the desired cable path 900. Correspondingly, the proposed cable support 50 may prove to be excellently suitable for mass production.

FIG. 7 provides a further embodiment of a cable support 50 comprising a common power connector 800. Preferably, as shown, multiple power cables 400 are connected to the E-axle 200 by a common power connector 800, at a distance beyond the E-axle mount 520. This allows the power cables 400 to be connected and disconnected from the E-axle without disassembling the E-axle mount 520, which may facilitate service and maintenance of the truck 10. Similarly, by having multiple power cables 400 connected to a common connector 800, e.g. a single piece connector having multiple ports, the power cables 400 can efficiently be disconnected from the E-axle for service and maintenance purposes. Since the power cables 400 extend in the vertical direction −Z beyond the E-axle mount 520, the unsupported vertical length may not contribute significantly to additional bending stresses in the power cables 400.

Preferably, the ports of the common power connector 800 are oriented in the lateral direction Y, i.e. perpendicular to the cable path 900, creating equal bending behavior of the power cables 400. For a similar reason, all power cables 400 preferably have equal length along the cable path 900 and to the common power connector 800.

Figure 8:
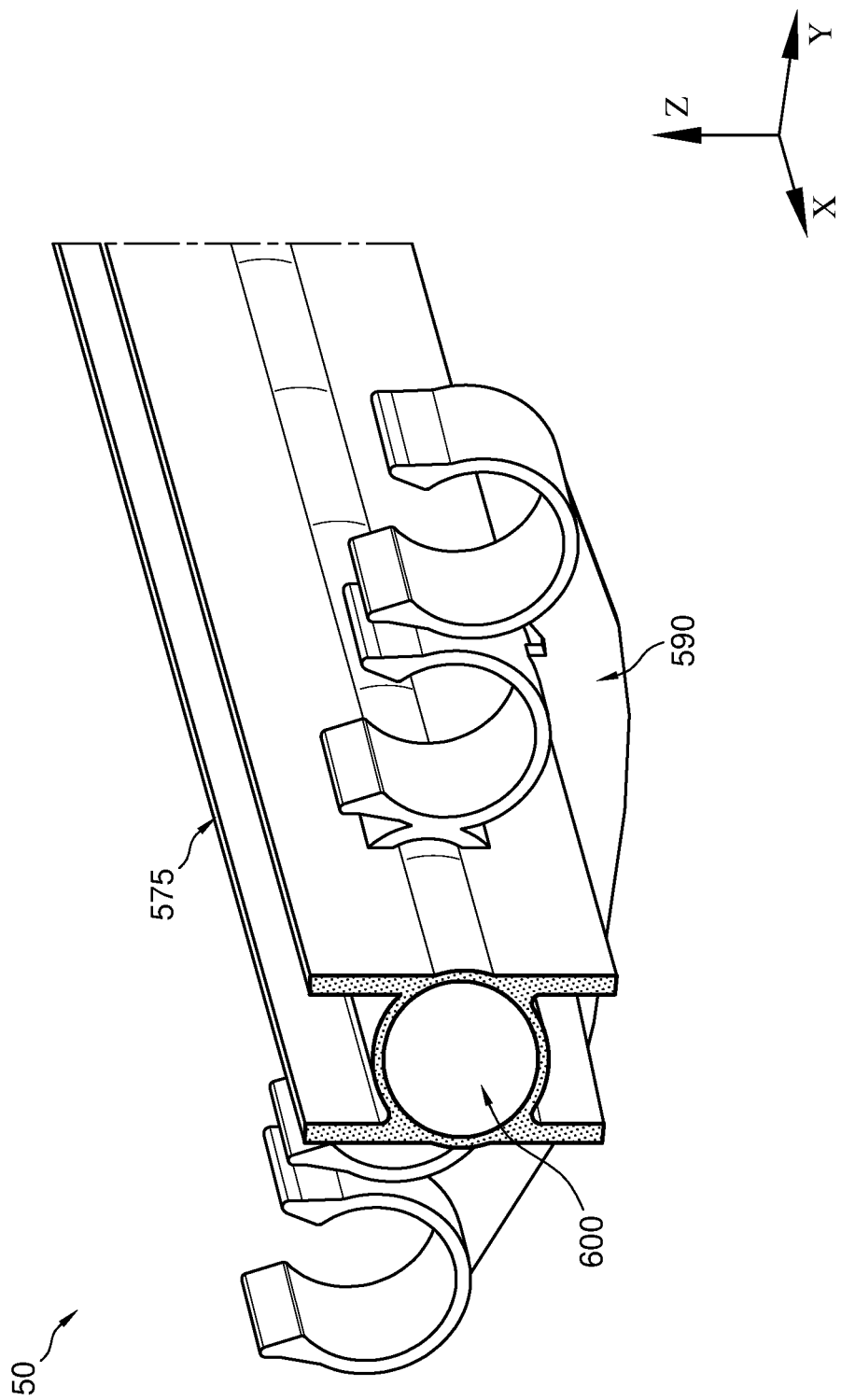
FIG. 8 provides a detailed view of an embodiment of a support beam.

FIG. 8 provides a detailed view of an embodiment of a support beam 500, comprising two vertically extending flanges 575 forming an H-beam to prevent the support beam 500 from deflecting in a lateral direction Y, and comprising laterally extending carriers 590 for leading multiple power cables 400 adjacent the cable path 900. Preferably, the conductive core 600 is a wire cable having multiple wire strands. For example, the wire cable can comprise 1×19 strands, 6×7 strands, 7×7 strands, or 6×19 strands. The number of bundles and strands can be seen as a measure for the flexibility of the conductive core 600, which can be matched with the flexibility of the support beam 500 to define the overall bending stiffness of the cable support 50. The wire cable material can be a low grade conductor such as steel or Aluminum, to create a ground connection between the E-axle 200 and the chassis 100.

In some preferred embodiments, the conductive core 600 is a fiber reinforced wire cable to provide the conductive core 600 with an additional function of strain relief for the power cables 400 between the E-axle 200 and the chassis 100.

The invention claimed is:
1. A truck with cable support, comprising:
a chassis, accommodating an electric power source for powering an electric motor;
an E-axle, comprising said electric motor and arranged as a rear wheel driving axle of the truck;
a suspension system, suspending the E-axle to the chassis and allowing movement of the E-axle in a vertical direction relative to the chassis;
a power cable, electrically connecting the electric power source to the E-axle; and
a support beam, forming a mechanical support structure to lead the power cable along a cable path extending between a chassis mount and an E-axle mount;
wherein the support beam comprises one or more bending stiffness elements, forming a stiffness of the support beam that is highest in a middle section and that decreases towards the chassis mount and the

E-axle mount, evenly distributing the bending stress in the support beam along the cable path when the E-axle moves relative to the chassis, to prevent local fatigue failure of the power cable.

2. The truck according to claim 1, the support beam further comprising an electrically conductive core, mounted between the chassis mount and the E-axle mount, to make a ground connection between the E-axle and the chassis.

3. The truck according to claim 2, wherein the support beam is mounted to the conductive core along at least a part of the cable path.

4. The truck according to claim 1, wherein the support beam comprises bending stiffness elements comprising one or more flanges extending along the cable path, the flanges having a flange height that is highest in the middle section and that decreases towards the chassis mount and the E-axle mount.

5. The truck according to claim 4, wherein the bending stiffness elements comprise two vertically extending flanges forming an H-beam to prevent the support beam from deflecting in a lateral direction.

6. The truck according to claim 1, wherein the support beam extends from the chassis mount in a backward direction along a longitudinal member of the chassis, and approaches the E-axle mount along the vertical direction.

7. The truck according to claim 1, wherein the E-axle comprises a rear section outer surface provided with connectors, to provide input ports to the electric motor.

8. The truck according to claim 7, wherein said connectors are provided in an orientation to guide one or more high voltage power cables adjacent the rear section outer surface in a vertical upward direction.

9. The truck according to claim 1, wherein the support beam comprises laterally extending carriers arranged for leading multiple power cables adjacent the cable path, each power cable following the cable path at a lateral offset from the support beam.

10. The truck according to claim 9, wherein the multiple power cables are connected to the E-axle by a common power connector, at a distance beyond the E-axle mount.

11. The truck according to claim 1, wherein the support beam is made of a polymer material.

12. The truck according to claim 1, wherein the conductive core is a wire cable having multiple wire strands.

13. The truck according to claim 1, wherein the conductive core is a fiber reinforced wire cable.

* * * * *